Patented June 16, 1942

2,286,228

UNITED STATES PATENT OFFICE 2,286,228

MODIFIED DICYANDIAMIDE CONDENSATION PRODUCT

Kurt E. Ripper, Bronxville, N. Y., assignor to American Cyanamid Company, New York, N. Y., a corporation of Maine No Drawing. Application December 30, 1939, Serial No. 311,935

5 Claims. (Cl. 260—42)

This invention relates to the production of condensation products of dicyandiamide with aldehydes and is more particularly directed to such products having hot-water resistance.

In a number of previous patents I have described various dicyandiamide-aldehyde resins and methods of preparing the same. In my Patent 1,812,374 are shown various methods for preparing heat-setting compositions by reaction of dicyandiamide with an aldehyde such as formaldehyde. In my Patent 2,060,122 and continuation application Serial No. 100,469, I have shown further details for the production of dicyandiamide resins and have described the polymerization of such resins under alkaline conditions. These resins are suitable for many purposes but, for some uses, it has been found that they are not as suitable as some of the other materials available due, primarily, to the fact that these dicyandiamide resins may lack sufficient resistance to hot water.

It is one of the objects of this invention to produce dicyandiamide resins of an improved character. It is another object to prepare such resins with improved hot-water resistance. It is a still further object to produce resins of this type economically while avoiding the defects of the prior resins.

These and other objects are attained by modifying the dicyandiamide resins with a small amount of melamine without losing the advantageous characteristics of dicyandiamide resins, as will be pointed out in greater detail.

The following examples are illustrative of my invention which is not restricted to the details thereof.

Example 1

To 480 parts by weight of 37% formaldehyde solution was added sufficient 2N NaOH to give a pH of 9.55 (glass electrode). To this alkaline formalin, 168 parts by weight of dicyandiamide and 31.5 parts by weight of melamine were added. The whole mixture was heated under reflux until boiling started which took fourteen minutes. At this time the whole mixture was water-clear and was then kept at the boiling point under reflux for an additional thirty minutes. (The ratios of the components were 1 mol of dicyandiamide to 0.125 mol of melamine to 3 mols of formaldehyde.) After this period a viscous syrup was obtained which remained clear on cooling, but if diluted with water had strongly hydrophobic properties.

Into this undiluted syrup, sheets of all-cotton paper (.007" thick) were dipped and allowed to dry at room temperature (25° C.) for thirty-six hours. Afterwards the sheets were placed in a drying oven at a temperature of 55° C. The temperature was raised during five minutes to 70° C. The resin content of the sheets was 58% of resin. Ten of the sheets so treated were stacked and the stack placed between stainless steel plates. A suitable hydraulic press was warmed up to 70° C., the assembly placed between the platens and pressure gradually applied. The temperature was then raised to 150° C. in thirty minutes and the pressure was kept at 2000 pounds per square inch. When the temperature of 150° C. was reached, the heat was turned off and the heating plates allowed to cool to 80° C. during twenty-five minutes. The result was a perfect laminated sheet with high gloss. A sample showed, after thirty minutes' immersion in boiling water, not the slightest sign of delamination or disintegration.

Example 2

5 parts by weight of guanidine carbonate were dissolved in 500 parts by weight of 37% formaldehyde solution. The pH was 9.22 (with the glass electrode). 140 parts by weight of dicyandiamide and 55 parts by weight of melamine were added and dissolved during heating up to the boiling point. The ratio was 1 mol of dicyandiamide to 0.25 mol of melamine to 3.6 mols of formaldehyde. The mixture was kept boiling under reflux for thirty-five minutes to give a syrupy condensation product.

Sheets were impregnated in the same manner as described in Example 1. The air-dried impregnated sheets were heat-treated for five minutes from 40° C. to 70° C. The resin content was 50%. Molding was carried out in the identical way as in Example 1. A perfect laminated sheet was obtained. The water absorption of a sheet of 0.45 inch thickness, after thirty minutes' immersion in boiling water, was only 4%.

Example 3

430 parts by weight of 37% formaldehyde solution were brought to a pH of 9.22 (glass electrode) by addition of 4.3 parts by weight of guanidine carbonate. 140 parts by weight of dicyandiamide and 55 parts by weight of melamine were reacted with the formaldehyde for forty-five minutes in the same way as described in Example 2. The ratios were 1 mol of dicyandiamide to 0.25 mol of melamine to 3.1 mol of formaldehyde.

The preparation of the laminated sheet differed from the two preceding examples in that the impregnated sheets, after twenty-four hours of air drying, were re-impregnated and again dried for twenty-four hours at room temperature. Polymerization was carried out during ten minutes at temperatures from 35° to 70° C. The resin content was 65%. Furthermore the temperature during molding the laminated sheet was raised only to 144° C.

A perfect sheet was obtained. The hot water test was excellent and the cold water test showed, after eight days of immersion in water of 25° C., only an increase of .67%.

The resins are not only suitable for laminating compositions but may also be used for the preparation of fast curing molding compositions which may be hardened under alkaline conditions and which yield moldings having excellent hot-water resistance. Such molding compositions may be prepared by comminuting the impregnated, dried, unlaminated sheets prepared as in the above examples, or may be compounded in the usual manner. The following is illustrative of one method of preparing a molding composition.

Example 4

408 parts by weight of the condensation product obtained according to the procedure described in Example 2, were mixed with 120 parts by weight of cotton-flock in a mixer for thirty-five minutes. The product was allowed to age for twenty-four hours. Then it was dried and polymerized by keeping it in a drying oven so that the temperature of the material was raised during twenty minutes from 30° C. to 70° C., and afterwards kept for sixty minutes at 70° C.–75° C. The dried product was ground for fifteen hours in a pebble mill and then .3% zinc stearate added.

The powder was preformed and yielded, at a temperature of about 160°–165° C., after three minutes' molding time without cooling, moldings of .010 inch thickness, which withstood the action of boiling water for thirty minutes without any disintegration. The absorption was only between 3.0% and 4.7%.

In the above examples it will be noted that the products are condensed under alkaline conditions and remain alkaline throughout the hardening or polymerization steps, in accordance with the teachings of my prior applications. This hardenability of the dicyandiamide resins under alkaline conditions is one of the outstanding properties of these resins and permits the use of such materials in applications for which the urea resins, for instance, are not generally adapted since the urea resins are hardened under acid conditions. Where resins are desired to be used with fillers which are either alkaline themselves or tend to combine with acids, urea-formaldehyde resins are not suitable since these fillers render an acid catalyst ineffective. For such purposes, my dicyandiamide resins are especially valuable. As typical of these fillers, I may mention "chrysotile" which is a common material and commercially available as fibers, yarns, textiles, paper, boards, etc. Chemically, "chrysotile" is $H_5Mg_3Si_2O_9$ or $3MgO.2SiO_2.2H_2O$ with a ratio of alkali to acid 3:2. This asbestos will neutralize an acid catalyst and, therefore, cannot be used with urea type plastics.

The use of asbestos as a filler material is especially desirable where the highest heat resistance of the plastic composition is required. Electrical insulation and brake linings are examples of such uses. The following is a typical example of the use of my resins with asbestos:

Example 5

500 parts by weight of 37% formaldehyde solution were brought to a pH of 9.55 by addition of 2N NaOH. 140 parts by weight of dicyandiamide and 55 parts by weight of melamine were reacted in the manner described in the preceding examples for thirty minutes under reflux with the alkaline formaldehyde solution. (The ratios were the same as in Example 2, namely 1 mol of dicyandiamide to .25 mol of melamine to 3.6 mol of formaldehyde.)

Asbestos cloth (containing 80% of asbestos and 20% of cotton) was impregnated with the above syrup. The impregnated asbestos cloth was dried for four and ¼ hours at room temperature and then kept in a drying oven for twenty-five minutes at 70° C. The resin content was 40%. Two pieces of the impregnated asbestos cloth were laminated in the way described in Example 1, with a specific pressure of 2000 pounds per square inch at a temperature up to 150° C. during thirty minutes, and during an additional twenty-five minutes cooled to 80° C. A shiny composition was obtained with remarkable resistance against boiling water. A part of the resulting plate was boiled for thirty minutes and showed, on a plate of .075 inch thickness, an increase in weight of only 1%.

I have also found that I may polymerize the resin in the impregnated asbestos cloth described by heat alone and without pressure. After the polymerization the cloth was inaffected by boiling water. From this it will be seen that combinations of dicyandiamide-melamine resins with asbestos, cured with or without pressure, are feasible.

Example 6

A condensation product was prepared from 430 parts by weight of 37% formaldehyde solution which has been brought to pH=9.55 (glass electrode) by addition of 2N NaOH. To this was added 140 parts by weight of dicyandiamide and 55 parts of weight of melamine. After forty-five minutes of refluxing, 250 parts by weight of the resultant syrup were mixed in with 240 parts by weight of asbestos. Another 250 parts by weight of syrup was mixed with 300 parts by weight of asbestos. These materials were aged for twenty-four hours at room temperature and heat-treated in the following way: these materials were kept for twelve minutes at rising temperatures of 45° C. up to 70° C., then the variation with the higher asbestos content for sixty-five minutes, the lower asbestos-containing batch for one hundred minutes at 70°–75° C. Afterwards the materials were disintegrated in a micropulverizer and mixed with .3% zinc stearate.

After three minutes' curing time at 160°–165° C. without cooling, moldings were produced.

Thus it will be seen that I modify the characteristics of dicyandiamide-aldehyde resins to a large extent by the inclusion of relatively minor amounts of melamine but these results are only obtained by following the polymerization and curing procedures found best for dicyandiamide resins. For most purposes it is desirable to use no more melamine than will give the desired properties in the finished products. I may use as little as ⅛ of a mol of melamine per mol of dicyandiamide to produce hot-water resistant materials. Thus a laminated sheet containing a resin made from this proportion of melamine can be subjected to immersion in boiling water for over thirty minutes without showing any signs of delamination or disintegration. It is possible to increase the amount of melamine used, although this material is preferably present in a minor amount as compared with the dicyandiamide in order not to lose the advantages of the latter compound. The use of ⅓ of a mol of melamine per mol of dicyandiamide is a convenient upper ratio.

In place of the formaldehyde mentioned in the examples, it will be obvious that I may use other aldehydes as found suitable and desirable. Other fillers than those described may be utilized in accordance with the purposes for which my compositions are to be used.

The conditions of condensation may be varied widely as, for instance, set forth in my prior patents. The temperatures and times of reaction may be varied. Likewise the hydrogen ion concentration of the reaction mixtures may also be changed somewhat although for best results the reaction should take place under alkaline conditions and preferably no less alkaline than pH 8.

My products may be utilized for preparing a wide variety of building materials such as shingles, partitions and the like and may even be used with various cement compositions since the alkaline nature of the cement facilitates the hardening and the polymerization of my resins. As has been pointed out, my compositions are especially adaptable for use with asbestos or similar materials to produce brake linings, electrical insulation and other similar products wherein heat resistance and great impact strength are factors. Likewise my materials may be used as adhesives, as well as for the treatment of textiles and other fibrous products wherein the alkaline polymerization makes my compositions especially valuable.

Other suitable changes and variations may be made in carrying out my invention without departing from the spirit and scope thereof as defined in the appended claims.

I claim:
1. A process which comprises reacting formaldehyde with a mixture containing dicyandiamide and melamine in a molar ratio between about 8:1 and 3:1, the reaction being carried out under alkaline conditions to produce a condensation product which may be polymerized and hardened under alkaline conditions to form a product capable of withstanding the influence of boiling water.

2. A process which comprises reacting formaldehyde with a mixture containing dicyandiamide and melamine in a molar ratio of about 4:1, the reaction being carried out under alkaline conditions to produce a condensation product which may be polymerized and hardened under alkaline conditions to form a product capable of withstanding the influence of boiling water.

3. A condensation product of formaldehyde with dicyandiamide and melamine in the molar ratio between about 8:1 and 3:1, said product having been prepared under alkaline conditions and being capable of being polymerized and hardened under conditions more alkaline than pH 7.0 to produce a material capable of withstanding the influence of boiling water.

4. A condensation product of formaldehyde with dicyandiamide and melamine in the molar ratio of about 4:1, said product having been prepared under alkaline conditions and being capable of being polymerized and hardened under conditions more alkaline than pH 7.0 to produce a material capable of withstanding the influence of boiling water.

5. A polymerized and hardened product having resistance to boiling water and produced by polymerization and hardening of a dicyandiamide - melamine - formaldehyde condensation product prepared under alkaline conditions and containing a proportion of melamine as compared with the dicyandiamide in the molar ratio between about 1:8 and 1:3, said polymerization and hardening having been carried out under conditions more alkaline than pH 7.0.

KURT E. RIPPER.